Jan. 1, 1935. J. P. SPANG 1,986,075
MACHINE FOR SLITTING MEAT
Filed April 3, 1933 4 Sheets-Sheet 1

Inventor.
Joseph P. Spang
by Heard Smith & Tennant.
Attys.

Jan. 1, 1935.  J. P. SPANG  1,986,075
MACHINE FOR SLITTING MEAT
Filed April 3, 1933   4 Sheets-Sheet 2
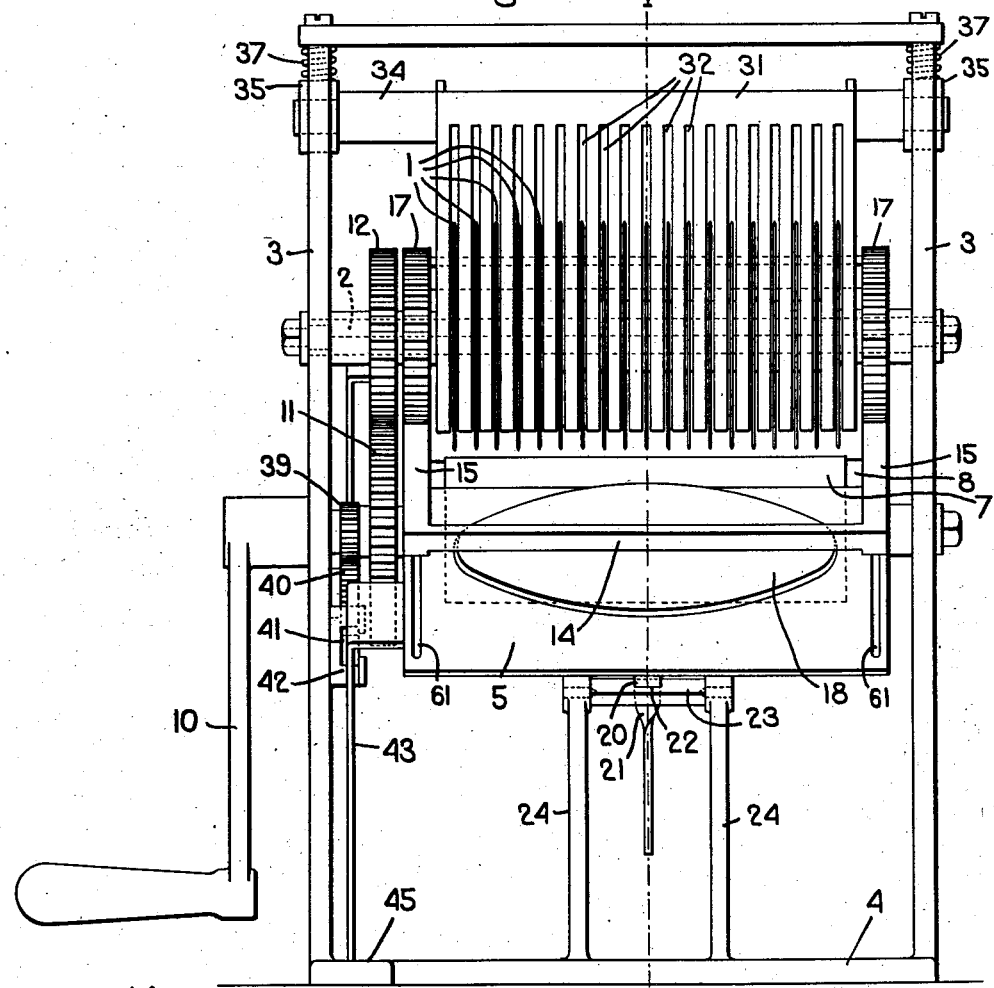
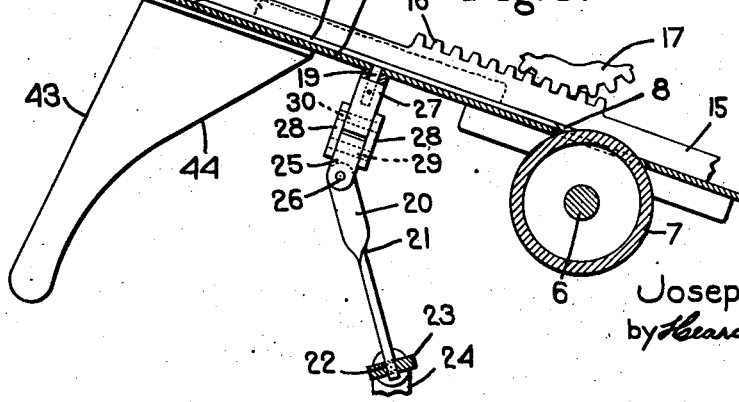
Inventor.
Joseph P. Spang
by Heard Smith & Tennant
Attys.

Jan. 1, 1935.  J. P. SPANG  1,986,075
MACHINE FOR SLITTING MEAT
Filed April 3, 1933   4 Sheets—Sheet 3
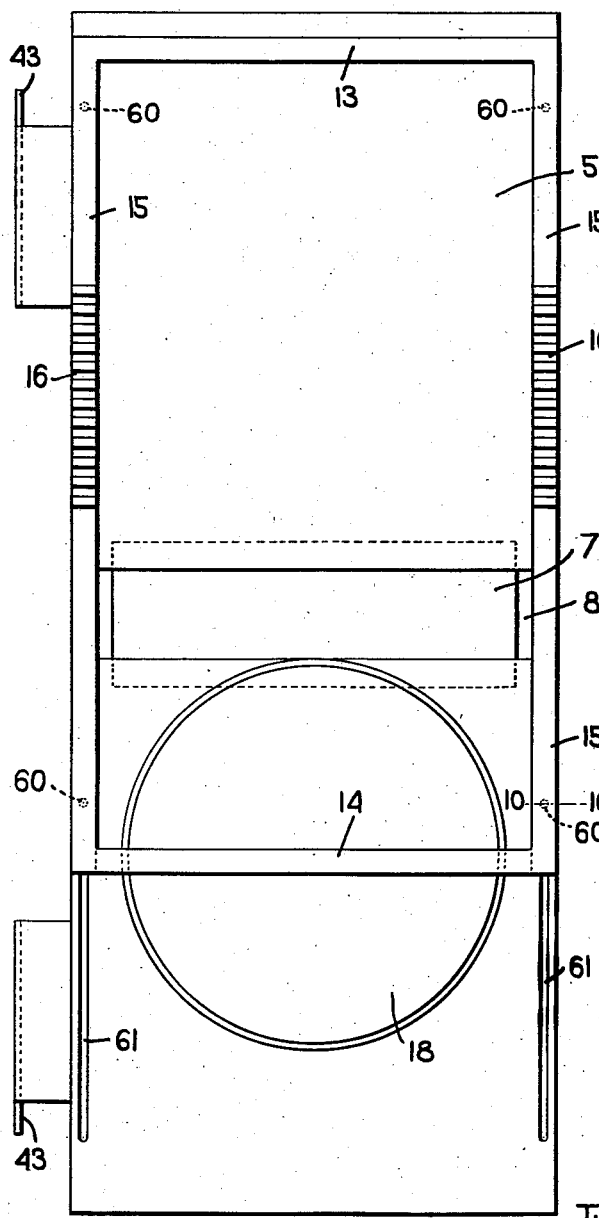
Fig.4.
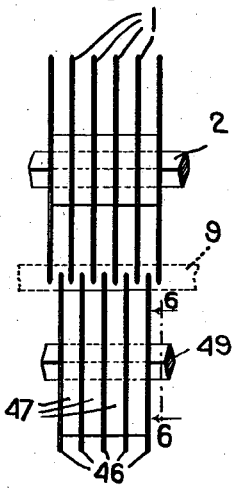
Fig.5.
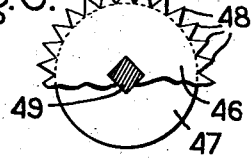
Fig.6.
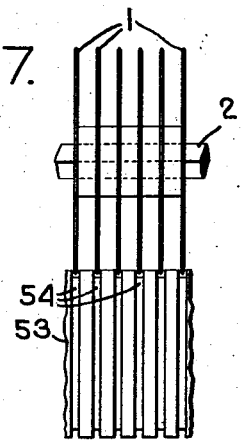
Fig.7.
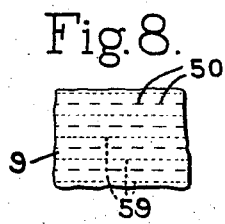
Fig.8.
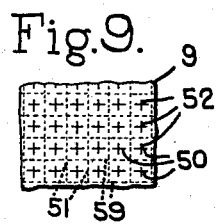
Fig.9.
Fig.10.
Inventor:
Joseph P. Spang
by Heard Smith & Tennant
Attys.

Jan. 1, 1935.   J. P. SPANG   1,986,075
MACHINE FOR SLITTING MEAT
Filed April 3, 1933   4 Sheets-Sheet 4

Inventor.
Joseph P. Spang
by Heard Smith & Tennant
Attys.

Patented Jan. 1, 1935

1,986,075

UNITED STATES PATENT OFFICE 1,986,075

MACHINE FOR SLITTING MEAT

Joseph P. Spang, Quincy, Mass.

Application April 3, 1933, Serial No. 664,091

13 Claims. (Cl. 17—26)

This invention relates to a machine for slitting meat and has for its general object to provide certain improvements in meat-slitting machines which are hereinafter described and then set forth in the claims.

In the accompanying drawings there are shown some embodiments of the invention which illustrate the principle thereof and which will now be described.

Fig. 2 is an end view of Fig. 1;

Fig. 3 is a fragmentary sectional view showing the platform in reverse position from that shown in Fig. 1;

Fig. 4 is a plan view of the meat-supporting table and the meat-feeding means;

Fig. 5 is a fragmentary view showing a different embodiment of the invention;

Fig. 6 is a section on the line 6—6, Fig. 5 with a part broken out;

Fig. 7 is a fragmentary view showing a still different embodiment of the invention;

Figs. 8 and 9 illustrate the manner in which the meat is slit by the device shown in Figs. 5 and 6.

Fig. 10 is a section on the line 10—10, Fig. 4.

The meat-slitting machine embodying my present improvements is provided with a gang of slitting knives, preferably rotary knives, a rocking meat-supporting platform which is swingable from a position in which one end is elevated into a position in which the other end is elevated, means to feed a slice of meat or other material along the surface of the platform from its elevated end toward its lowered end and past the slitting knives, whereby a plurality of slits are cut in the meat or other material and means to reverse the position of the platform at the end of the meat-feeding movement.

In the preferred embodiment of my invention the platform is provided with a turntable arranged so that when the meat or other material has been fed from its upper end past the knives to the lower end said meat will be received on a turntable which will be automatically turned, preferably through a 90° angle, during the rocking movement of the platform by which it is reversed in position so that when the meat or other material is fed a second time from the elevated end of the platform toward the other end a second series of slits will be cut in the meat at an angle to those cut by the first pass of the meat past the knives.

Figure 1:
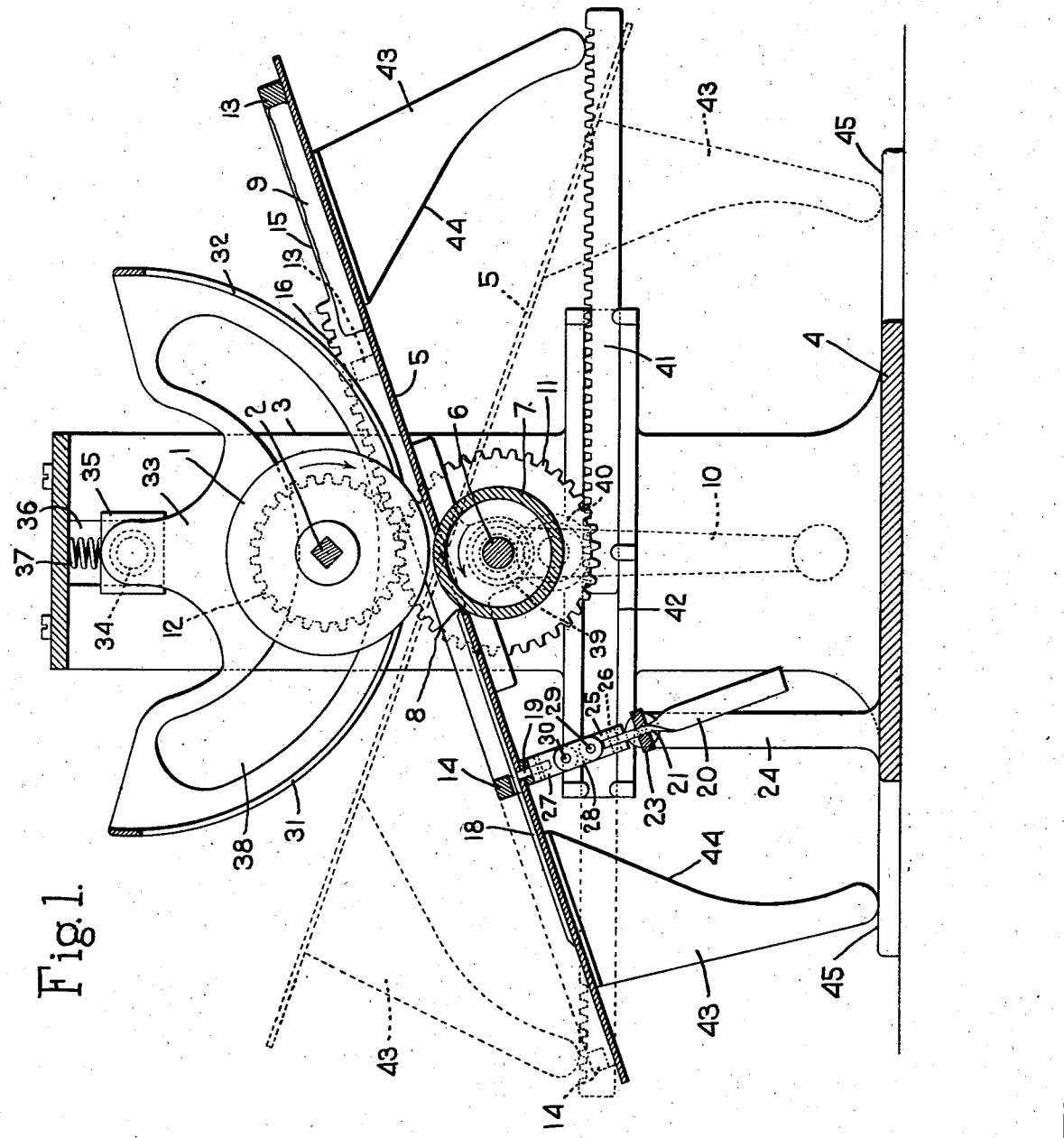
Fig. 1 is a sectional view through a meat-slitting machine embodying my invention taken on substantially the line 1—1, Fig. 2.
Figure 11:
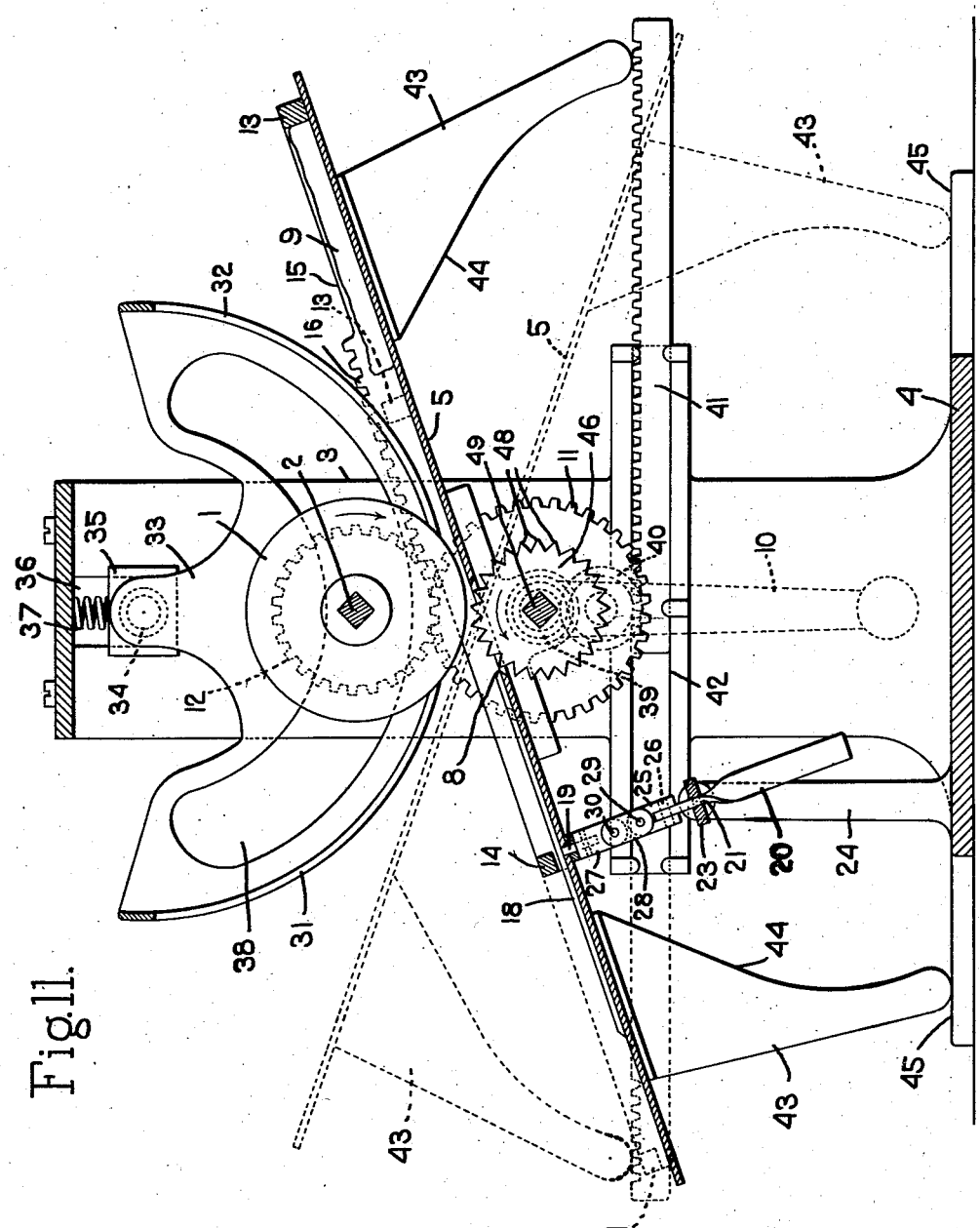
Fig. 11 is a sectional view similar to Fig. 1 but showing the type of feed roll illustrated in Figs. 5 and 6.

Referring now to Fig. 1 the gang of slitting knives is indicated at 1 and these are shown as rotary disk knives which are mounted on a shaft 2. The gang of knives may comprise any number of knives and they may be spaced any desired distance apart. The shaft 2 is journalled at its ends in the uprights 3 of a suitable supporting frame 4.

Associated with the gang 1 of knives is a rocking platform 5 which is swingable about an axis parallel to that of the knives from a position in which one end is elevated to a position in which the other end is elevated. As shown in full lines in Fig. 1 the platform 5 is in a position in which the right hand end is elevated and said platform is swingable into the dotted line position in which the left hand end is elevated. This platform is mounted for swinging movement about a shaft 6 that is journalled in the sides 3 of the frame 4.

7 indicates a feed roll which is fast on the shaft 6 and which is so positioned relative to the platform 5 that a portion of the periphery of the feed roll 7 projects through an opening 8 with which the platform 5 is provided.

In slitting a piece of meat, such as a slice 9, the latter will be placed on the elevated end of the platform, which is the right hand end as shown in full lines in Fig. 1 and then said slice of meat is fed downwardly along the surface of the platform 5, past the knives 1 and between the latter and the roll 7, during which operation the knives 1 serve to cut slits in the meat. After the meat has passed the knives it will be delivered therefrom onto the lower end of the platform 5.

When the device is used for slitting meat to improve its flavor when broiled and incidentally to make it more edible, the relation between the knives 1 and the platform 5 and roll 7 will be such that the knives will cut slits nearly but not quite through the meat and in thus slitting the meat both the knives 1 and the roll 7 are positively rotated. The means for rotating these two parts is preferably so constructed that the knives will rotate with a greater surface speed than the roll 7 and as a result said knives perform their slitting operation with a shear or draw cut.

While any appropriate means for rotating the roll 7 and knives 1 may be employed I have shown a handle 10 which is fast on one end of the shaft 6 and by which the roll 7 may be positively rotated. The shaft 6 has a gear 11 fast thereon which meshes with a gear 12 fast on the knife shaft 2 and hence the rotation of the shaft 6 is communicated to the shaft 2. The gear 11 is larger than the roll 7 and is also larger than the gear 12 while the gear 12 is smaller in diameter than the knives 1. As a result the surface speed of the knives 1 will be somewhat greater than that of the roll 7, whereby the knives will operate with the draw cut as above described.

I have provided herein a feeding device constructed to positively feed the slice 9 of meat or other material along the platform 5 from the raised end past the knives to the lowered end. This feeding means is in the form of two bars 13, 14 extending transversely across the platform 5 and connected by side pieces 15. The feeding member thus is in the form of a skeleton rectangular frame which is guided in its movement on the platform by pins 60 which operate in slots 61 formed in the platform.

When the parts are in the position shown in Fig. 1 the feeding bar 13 will be at the upper end of the platform, and means are provided for moving the skeleton frame along the surface of the platform from the upper end toward the lower end. Such movement carries the bar 13 from the full to the dotted line position in Fig. 1 and said bar 13 during the shifting movement will feed the meat 9 downwardly toward the knives. As soon as the front edge of the slice 9 of meat comes into position to be engaged by the knives the rotative movement of the knives in the direction of the arrow Fig. 1 has a tendency to assist the feeding movement of the meat and when the front edge of the meat has reached a position where it is engaged by the roll 7 then the combined action of the roll and the knives serves to continue the feeding movement of the meat till it is free from the knives on the left hand side.

Means are provided for giving the feeding means its operative movement by the rotation of the knife shaft 2. For this purpose the sides 15 of the skeleton frame are formed with rack teeth 16 which are adapted to mesh with gears 17 fast on the knife shaft 2. The teeth 16 are formed on a limited portion of each of the sides 15 as shown in Fig. 1.

When the table is in the full line position in Fig. 1 with the feeding bar 13 at the upper end of the table the left hand end 16 on each side portion will be in engagement with the corresponding gear 17. As the knives are rotated the feeding frame 13, 14, 15 is moved downwardly to the dotted line position in Fig. 1 at which time the gear teeth 16 pass out of mesh with the gears 17. By this time the slice 9 of meat has been fed sufficiently forward so that the feeding movement thereof will continue by the rotary movement of the knives 1 and the feed roll 7. During the further rotation of the knives the feeding frame 13, 14, 15 will remain stationary because the rack teeth 16 have been carried out of mesh with the gears 17.

18 indicates a turntable which is rotatively mounted on the platform 5 at the left hand side of the knives and feed roll. As the slice of meat makes its first pass between the knives and the feed roll it is delivered onto the turntable 18. At the end of the meat-feeding movement the platform is rocked or tilted about the shaft 6 from the full to the dotted line position so as to bring the left hand end onto which the meat has been delivered into an elevated position and during this rocking movement the turntable 18 is turned, preferably through the 90° angle.

Any suitable means for thus turning the turntable may be employed. As herein shown the turntable is provided with a spindle 19 which extends through the platform 5 and is connected to a flat bar 20 having a quarter twist 21 therein. This bar extends through a slot 22 formed in a rocking member 23 that is mounted in two uprights 24 with which the frame 4 is provided.

The connection between the twisted bar 20 and the stud 19 of the turntable is a flexible one which functions somewhat like a universal joint. The upper end of the bar 20 has a block 25 pivoted thereto at 26 and this block is connected to another block 27 which is fast on the stud 19 through a pair of links 28 which are pivotally connected to the block 25 at 29 and to the block 27 at 30. The axes of the pivots 29 and 30 are at right angles to the pivot 26 and this linkage connection thus provides a flexible connection which is on the order of a universal joint.

As the platform 5 swings from the full to the dotted line position Fig. 1 or from the full line position shown in Fig. 1 to the position shown in Fig. 3 the bar 20 is withdrawn upwardly through the slot 22 and as the twisted portion 21 of the bar passes through the slot said bar will be turned about an axis extending in the direction of its length thereby operating through the flexible connection 25 and 30 to turn the turntable 18.

The swinging of the platform from the full to the dotted line position Fig. 1 will, therefore, result in giving the turntable a quarter turn and when this has been accomplished the knives 1 and feed roll 7 are rotated in the opposite direction from that indicated by the arrows in Fig. 1 and the slice of meat on the turntable is fed along the platform 5 from the then upper end thereof toward the lower end or from the left to the right in Fig. 1. The meat will thus be provided with a second series of slits cut therein which cross the slits of the first series formed by the movement of the meat from the right hand end of the platform toward the left.

It will be remembered that during the feeding movement of the meat from the right hand end of the platform to the left the teeth 16 are carried out of mesh with the gears 17, and this disconnection of the teeth 16 from the gears 17 occurs after the forward edge of the slice 19 has been fed between the knives 1 and the roll 7 but before the meat has been carried clear past the knives so that the final movement of the meat is accomplished by the rotation of the knives and the feed roll 7. When the plateform is swung from the full line position in Fig. 1 into the dotted line position or into the position shown in Fig. 3 the rack teeth 16 are again brought into mesh with the gears 17 so that when the direction of rotation of the knives 1 and feed roll 7 is reversed the gears 17 which are then in mesh with the rack teeth 16 serve to give the feeding frame a movement toward the right Fig. 3 and during this movement the bar 14 will engage the slice 9 of meat and positively move it toward the right and into position to be engaged by the knives 1 and feed roll 7.

The meat is thus returned to the right hand end of the platform 5, which is then in the lowered position shown in dotted lines in Fig. 1, and during the second pass of the slice 9 of meat between the knives and the feed rolls a second series of slits will be cut in the meat which will cross the slits of the first series made by the first pass of the meat between the knives and the feed roll.

31 indicates a hold-down member, the function of which is to apply a yielding pressure to the top surface of the slice 9 of meat during the slitting operation so as to hold the meat against the platform 5 and prevent it from being lifted off the platform by the knives. This hold-down member is in the form of a convexly-curved plate 31 having slots 32 through which the knives 1 extend. This plate is rigid with and is carried by two end members 33, each of which is pivoted at 34 to a block 35 that is mounted for vertical movement in a slot 36 formed in one of the side pieces 3 of the frame. Each block is backed by a spring 37 which provides the yielding pressure of the hold-down against the slice 9 of meat. Each end plate 33 is formed with a slot 38 through which the shaft 2 extends.

This hold-down member is normally in the position shown in Fig. 1, but as the slice 9 of meat is fed forward to a point where the top surface of the meat engages the convex face of the plate 31 then the friction of the meat with the plate will cause the hold-down member to rock about its pivots 34 as the feeding of the meat proceeds so that the meat is fed between the hold-down member and the platform 5. The springs 37 provide the yielding pressure of the hold-down member against the meat and also allow the hold-down member to accommodate itself to slices 9 of different thicknesses.

While it is within my invention to swing the platform 5 from one position to another by hand yet I have illustrated herein a construction by which the platform derives its swinging movement from the rotation of the shaft 6.

The shaft 6 for the roll 7 is shown as having a gear 39 fast thereon which meshes with an intermediate gear 40 mounted on a stud carried by the frame. This gear 40 in turn meshes with a rack bar 41 which is guided in a horizontal direction in a guiding groove or way 42 formed in one of the side pieces 3 of the frame.

The platform has secured thereto and depending therefrom at each end a wing 43 provided with a cam surface 44 that is adapted to be engaged by the end of the rack bar 41.

Assuming the parts are in the position shown in Fig. 1 then it will be observed that when the handle 10 is actuated to rotate the knives 1 and feed roll 7 in the direction of the arrow Fig. 1 and to give the meat feeding frame its meat-feeding movement to the left the rack bar 41 will be moved toward the left through the gears 39 and 40. By the time the meat 9 has been fed between the knives 1 and the roll 7 and has been fed onto the turntable 18 the left hand end of the rack bar 41 will engage the cam surface 44 of the wing 43 at the left hand end of the platform and after this occurs the continued movement of the rack 41 to the left will produce a camming action against the cam surface 44 which will tilt the platform from the full to the dotted line position. As the tilting action proceeds the cam surface 44 wipes over the end of the rack bar 41 and when the tilting action is complete the end of the wing 43 will have been raised to a point so that the rack bar may pass under it as shown by dotted lines in Fig. 1. At this time the lower end of the right hand wing 43 is brought against a rest or stop portion 45 on the frame 4 and the platform is held in its inclined position by reason of the fact that the lower end of one wing 44 engages the rest 45 and the other wing rests on the rack bar 41.

When the direction of rotation of the knives 1 and roll 7 is reversed to feed the meat from the left hand end of the platform, which is then in its raised position, to the right hand end, the rack bar 41 will be shifted from its left hand dotted line position Fig. 1 back to the position shown in full lines Fig. 1 and during such shifting movement the right hand end of the rack bar will engage the cam surface 44 of the right hand wing 43, thereby tilting the platform from the dotted 43 to the full line position and when this tilting movement is completed the end of the left hand wing 43 will be resting on the left hand rest 45 while the lower end of the right hand wing 43 will rest on top of the rack bar 41, thereby locking the platform in the full line position.

The device as thus far described is designed to cut two series of slits in a slice of meat or other material with the slits of one series crossing those of the other. The first series of slits will be made as the slice of meat is fed from the upper or right hand end of the platform 5 past the knives to the left hand side and onto the turntable 18. The tilting movement of the turntable above described will turn the meat through a 90° angle and when the knives and feed roll are rotated in a reverse direction the slice of meat will be carried back between the knives and the roll from the then raised left hand end of the platform to the right hand end, thereby cutting the second series of slits.

In Figs. 5 and 6, I have illustrated a construction wherein the smooth surfaced feed roll 7 shown in Figs. 1 to 4 is replaced by a special feed roll designed to cut short slits in the meat on the under side thereof and located between the continuous slits formed by the knives 1. In this embodiment the fed roll 7 is replaced by a roll provided with a series of toothed disks 46 which are spaced from each other by spacers 47 and which have the same spacing as the knives 1. The disks 46, however, have a staggered relation to the knives 1 and are located between the knives.

The teeth of the toothed disks 46 are indicated at 48 and these are shown as pointed teeth and the teeth on any disk are spaced apart a distance equal to the spacing of the knives 1. These toothed disks 48 are mounted on a shaft 49 which is the equivalent of the shaft 6 shown in Fig. 1 and to which the handle 10 is secured. When the slice 9 of meat is fed between the knives 1 and the disks 48 as shown in Fig. 5 the knives will cut continuous slits in the upper surface of the meat and the teeth 48 will cut short slits in the under side of the meat which are located between the continuous slits formed by the knives 1. This is shown in Fig. 8, which is a fragmentary view of a portion of the under side of a slice of meat 9 after it has made one pass between the knives and the disks. The continuous slits made by the knives 1 are indicated by the dotted lines 59 and the short slits made by the teeth 8 are indicated by the short lines 50.

When the meat has been deposited on the turntable and has been turned through a 90° angle and then is fed back between the knives 1 and the discs 46 again the knives 1 will form a second series of slits in the meat at right angles to the slits represented by the dotted lines 59 and as indicated by the dotted lines 51. The disks 46 will cut other short slits 52 in the under side of the meat which will cross the slits 50 as shown in Fig. 9. The upper surface of the meat is thus cut into squares as shown by the dotted lines 59 and 51 in Fig. 9 and the under side of the meat is provided with crossing short slits 50, 52, each pair of crossing slits being located in one of the squares formed by the continuous slits 59, 51.

The machine herein illustrated is also adapted to cut vegetables and other material into strips or cubes and when used in this way the smooth-surfaced roll 7 will be replaced by a grooved feed roll 53 as shown in Fig. 7, said feed roll having grooves 54 matching the knives 1. This feed roll 53 is of such a size that the knives 1 enter the grooves 54 slightly so that as a slice of material is fed between the knives and the rolls the knives will cut through the material, thus cutting it into strips. The first pass of the material between the knives will cut it into strips and if the material is given a second pass between the knives and the rolls after it has been turned through 90° by the turntable then the second operation of the knives will cut the strips into cubes.

A device of this construction can be readily used for cubing or dicing vegetables and similar food material.

I claim.

1. A meat-slitting machine having a gang of knives, a rocking meat-supporting platform swingable from a position in which one end is elevated above the other to a position in which the other end is elevated, means to feed a slice of meat along the platform past the knives thereby to cut slits in said meat, and means to reverse the position of the platform.

2. A meat-slitting machine having a gang of knives, a rocking meat-supporting platform swingable about a horizontal axis from a position in which one end is elevated to a position in which the other end is elevated, means to feed a slice of meat along said platform past the knives from the elevated end toward the other end, and means to reverse the position of the platform.

3. A meat-slitting machine having a gang of knives, a rocking meat-supporting platform swingable about a horizontal axis from a position in which one end is elevated to a position in which the other end is elevated, means to feed a slice of meat along said platform past the knives from the elevated end toward the other end, and means operative after the meat has been fed past the knives to reverse the position of the platform.

4. A meat-slitting machine having a gang of knives, a rocking meat-supporting platform swingable from a position in which one end is elevated above the other to a position in which the other end is elevated, means to feed a slice of meat along the platform past the knives thereby to cut slits in said meat, and means to reverse the position of the platform, said feeding means being operative to feed a slice of meat along said platform in either direction.

5. A meat-slitting machine having a gang of rotary knives, a rocking meat-supporting platform situated beneath the knives and swingable about a horizontal axis parallel to that of the knives from a position in which one end is elevated to a position in which the other end is elevated, means to rotate the knives in a direction tending to feed the meat along the platform from the upper end thereof toward the lower end.

6. A meat-slitting machine having a gang of rotary knives, a rocking meat-supporting platform situated beneath the knives and swingable about a horizontal axis parallel to that of the knives from a position in which one end is elevated to a position in which the other end is elevated, means to rotate the knives in a direction tending to feed the meat along the platform from the upper end thereof toward the lower end, and means actuated by the knife-rotating means to reverse the position of the platform.

7. A meat-slitting machine having a gang of slitting knives, a rocking meat-supporting platform situated beneath the knives and swingable about a horizontal axis from a position in which one end is elevated to a position in which the other end is elevated, a turntable carried by said platform on one side of said knives, means to feed a slice of meat along the platform past the knives and onto the turntable, said feeding means being reversible and constructed to feed said piece of meat from the turntable back past the knives, and means to reverse the position of the platform.

8. A meat-slitting machine comprising a gang of rotary slitting knives, a meat-supporting platform situated beneath said knives, means to rotate the knives, a turntable carried by the platform on one side of said knives, and means to feed a slice of meat along the platform past the knives onto the turntable, said feeding means being reversible and adapted to feed the slice of meat from the turntable back past the knives again.

9. A meat-slitting machine comprising a gang of rotary knives, a meat-supporting platform beneath the knives, a turntable on said platform on one side of the knives, means to feed a slice of meat along the platform past the knives onto the turntable, and means to give the turntable a turning movement, said meat-feeding means being reversible and constructed to feed said slice of meat from the turntable back past the knives.

10. A meat-slitting machine comprising a gang of rotary slitting knives, a rocking meat-supporting table situated beneath the knives and swingable from a position in which one end is elevated to that in which the other end is elevated, a turntable carried by said platform on one side of the knives, means to rotate the knives, means actuated by the knife-rotating means to feed the meat from the upper end of the platform past the knives onto the turntable and from the turntable back past the knives again, means to rotate the turntable after the meat has been fed thereonto, and means to reverse the position of the platform.

11. A machine of the class described comprising a gang of knives, a rocking platform swingable from a position in which one end is elevated to a position in which the other end is elevated, means to feed the material to be slit along the platform past the knives, whereby slits are cut in said material, and means to reverse the position of the platform.

12. A device of the class described comprising a gang of rotary knives, a rocking platform swingable about a horizontal axis from a position in which one end is elevated to a position in which the other end is elevated, means to rotate the knives, a turntable carried by the platform on one side of the knives, feeding means for feeding material along the platform past said knives and onto said turntable, whereby slits are cut in said material, means to reverse the position of the platform, and means rendered operative by the reversing movement of the platform to turn the turntable.

13. A device of the class described comprising a gang of rotary knives, a rocking platform swingable about a horizontal axis from a position in which one end is elevated to a position in which the other end is elevated, means to rotate the knives in either direction, a turntable mounted on the platform at one side of said knives, feeding means actuated by the knife-rotating means to feed material along the platform past the knives, and means to reverse the position of the platform.

14. A device of the class described comprising a gang of rotary knives, a rocking platform swingable about a horizontal axis from a position in which one end is elevated to a position in which the other end is elevated, means to rotate the knives in either direction, a turntable mounted on the platform at one side of said knives, feeding means actuated by the knife-rotating means to feed material along the platform past the knives, means to reverse the position of the platform, and means to turn the turntable by the reversing movement of the platform.

15. A device of the class described comprising a gang of rotary knives, a rocking platform swingable about a horizontal axis from a position in which one end is elevated to a position in which the other end is elevated, means to rotate the knives in either direction, a turntable mounted on the platform at one side of said knives, feeding means actuated by the knife-rotating means to feed material along the platform past the knives, means actuated by the knife-rotating means to reverse the position of the platform, and means rendered operative by the reversing movement of the platform to rotate the turntable.

16. A meat-slitting machine having a meat-supporting platform on which meat is fed forward, a plurality of slitting knives to form in one side of the meat as it is fed forward a plurality of continuous slits extending in the direction of the feeding movement, and means operating simultaneously with said slitting knives to form in the other side of said meat a plurality of rows of short slits, each short slit extending in the direction of feed and each row also extending in the direction of feed.

17. A meat-slitting machine having a meat-supporting platform on which a slice of meat is fed forward, a plurality of slitting knives to cut in one side of the meat as it is fed forward a plurality of parallel continuous slits extending in the direction of feed, and means operating simultaneously with the cutting of the continuous slits to cut in the opposite side of the meat a plurality of rows of short slits, similar in number to the continuous slits, which rows extend parallel to the continuous slits, each row of short slits being situated between two adjacent continuous slits and the short slits in each row extending in the direction of said row.

18. A meat-slitting machine having a meat-supporting platform on which a slice of meat is fed forward, a plurality of slitting knives above the platform to cut in the upper side of the slice as it is fed forward a plurality of parallel continuous slits extending in the direction of feed, and means operating simultaneously with the cutting of the continuous slits to cut in the under face of the slice of meat a plurality of rows of short slits, which rows extend parallel to the continuous slits, there being the same number of rows as there are continuous slits, and each row of short slits being situated between two adjacent continuous slits, and the short slits in each row extending in the direction of said row.

JOSEPH P. SPANG.